(12) United States Patent
Yang et al.

(10) Patent No.: US 12,115,859 B2
(45) Date of Patent: Oct. 15, 2024

(54) IN-WHEEL MOTOR

(71) Applicant: LG ELECTRONICS INC., Seoul (KR)

(72) Inventors: Haerim Yang, Seoul (KR); Seung-Suk Oh, Seoul (KR); Yeongjae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 832 days.

(21) Appl. No.: 17/092,988

(22) Filed: Nov. 9, 2020

(65) Prior Publication Data

US 2021/0178893 A1 Jun. 17, 2021

(30) Foreign Application Priority Data

Dec. 26, 2019 (KR) .......................... 10-2019-0175610

(51) Int. Cl.
*B60K 7/00* (2006.01)
*B60K 17/04* (2006.01)
(Continued)

(52) U.S. Cl.
CPC .......... *B60K 7/0007* (2013.01); *B60K 17/046* (2013.01); *F16C 3/02* (2013.01);
(Continued)

(58) Field of Classification Search
CPC ................ B60K 2007/0038; B60K 2007/0092
See application file for complete search history.

(56) References Cited

U.S. PATENT DOCUMENTS 5,164,623 A * 11/1992 Shkondin ............... H02K 25/00
310/67 R
5,427,193 A * 6/1995 Avakian ................. B60L 3/0061
318/400.41
(Continued)

FOREIGN PATENT DOCUMENTS

CN          1098191 C      1/2003
CN          206164284 U    5/2017
(Continued)

*Primary Examiner* — Erez Gurari
(74) *Attorney, Agent, or Firm* — Bryan Cave Leighton Paisner LLP

(57) ABSTRACT

According to an embodiment of the present disclosure, provided is a high-output, high-torque in-wheel motor having a power line-taken-out structure. According to an embodiment of the present disclosure, the in-wheel motor includes a circular rim; a shaft connected to the rim through a center of the rim; a motor assembly including a stator connected to the shaft in the rim and a rotor surrounding the stator and rotated about the stator; a cover coupled to an opening of the rim to block the motor assembly from an outside of the rim; and a bearing contacting and configured to support the shaft. The shaft includes a first shaft body passing through a center of each of the rim and the cover and extending outward; and a second shaft body having a larger diameter than a diameter of the first shaft body and disposed between the stator and the bearing. A power line for supplying power to the motor assembly is inserted in a radial direction of the second shaft body between the stator and the bearing and is taken out in a longitudinal direction of the second shaft body. According to an embodiment of the present disclosure, even when a diameter of the power line is increased to achieve the high-output, high torque performance of the in-wheel motor, structural rigidity of the shaft may not be degraded.

15 Claims, 10 Drawing Sheets

(51) Int. Cl.
*F16C 3/02* (2006.01)
*H02K 7/00* (2006.01)
*H02K 7/08* (2006.01)
*H02K 7/116* (2006.01)

(52) U.S. Cl.
CPC ............. H02K 7/003 (2013.01); H02K 7/006 (2013.01); H02K 7/088 (2013.01); H02K 7/116 (2013.01); *B60K 2007/0038* (2013.01); *B60K 2007/0092* (2013.01); *F16C 2326/20* (2013.01)

(56) References Cited

U.S. PATENT DOCUMENTS

| | | | | |
|---|---|---|---|---|
| 5,465,802 | A * | 11/1995 | Yang | B60T 1/067 310/67 R |
| 5,633,544 | A * | 5/1997 | Toida | H02K 29/08 310/67 R |
| 6,278,216 | B1 * | 8/2001 | Li | B60L 50/20 310/67 A |
| 2005/0104470 | A1 * | 5/2005 | Perkins | H02K 21/222 310/61 |
| 2008/0053725 | A1 * | 3/2008 | Kramer | B60K 7/0007 280/124.128 |
| 2009/0033166 | A1 * | 2/2009 | Takeuchi | H02K 7/14 318/400.41 |
| 2009/0230788 | A1 * | 9/2009 | Kurokawa | B60L 1/02 310/54 |
| 2016/0329775 | A1 * | 11/2016 | Jang | H02K 7/14 |
| 2017/0314666 | A1 * | 11/2017 | Furuuchi | F16H 57/0424 |
| 2017/0324297 | A1 * | 11/2017 | Furuuchi | H02K 7/14 |
| 2019/0002056 | A1 * | 1/2019 | Zhu | H02K 7/006 |
| 2019/0241186 | A1 * | 8/2019 | Lee | B60K 6/48 |
| 2019/0329809 | A1 * | 10/2019 | Mackay | B60K 7/00 |
| 2020/0346488 | A1 * | 11/2020 | Oh | B60B 7/01 |
| 2020/0373806 | A1 * | 11/2020 | Nam | H02K 21/22 |
| 2020/0391719 | A1 * | 12/2020 | Oh | B60T 13/741 |
| 2021/0094413 | A1 * | 4/2021 | Kim | B60K 17/046 |
| 2021/0146772 | A1 * | 5/2021 | Takamatsu | B62J 43/20 |
| 2021/0178893 | A1 * | 6/2021 | Yang | B60K 17/046 |
| 2023/0182859 | A1 * | 6/2023 | Huang | H02K 3/26 301/6.5 |

FOREIGN PATENT DOCUMENTS

DE 102016223964 A1 6/2018
DE 102019204673 A1 10/2019

* cited by examiner

[PRIOR ART]

[PRIOR ART]

IN-WHEEL MOTOR

CROSS-REFERENCE TO RELATED APPLICATION

This application claims priority to and the benefit of Korean Patent Application No. 10-2019-0175610, filed on Dec. 26, 2019, the disclosure of which is incorporated herein by reference in its entirety.

BACKGROUND

1. Field of the Disclosure

The present disclosure relates to a high-output, high-torque in-wheel motor having a power line-taken-out structure.

2. Description of Related Art

In-wheel motors may be used in moving means. The moving means may be operated using electricity as a power source.

The in-wheel motor may be powered by a motor assembly disposed in a rim.

The motor assembly may include a stator and a rotor. The power generated from the motor assembly may be transmitted directly to a wheel of the in-wheel motor without passing through additional power transmission devices.

The wheel wound around the rim of the in-wheel motor may rotate using electricity as a power source.

In contrast to moving means in related art, the in-wheel motor may have a relatively simple structure because the in-wheel motor does not require a driving device and a power transmission device having complicated structures.

Therefore, the in-wheel motor may enable weight reduction of the moving means and reduces energy loss generated during power transmission.

The in-wheel motor may include a tire, a rim, a motor assembly, and a shaft.

The tire may surround and be coupled to the rim. The motor assembly may include a stator and a rotor, and be disposed in the rim. The shaft may be connected through a center of the stator.

The stator of the in-wheel motor may receive power through an externally connected power line (or a taken-out line). When the power is supplied to the stator, the rotor may rotate around the stator.

As the rotor is connected to the rim, the rim rotates when the rotor rotates, and the tire coupled to an outer ring of the rim also rotates.

As the required output of single-person electric scooters and electric vehicles increases, a diameter of a power line for supplying power to the in-wheel motor is also increasing.

FIG. 1 is a schematic view showing an in-wheel motor in related art. An in-wheel motor 10 in the related art includes a tire 20, a rim 30, a motor assembly 40 including a stator 41 and a rotor 43, a gear assembly 50 including a sun gear 51, a planetary gear 53, and a carrier 55, a shaft 60, a bearing 80, and a cover 90.

The in-wheel motor 10 in the related art includes a power line 70. The power line 70 supplies power to the stator 41.

Further, for the in-wheel motor 10 in the related art, a shaft 60 defines a hollow 61 to take out the power line 70 to an outside thereof. The power line 70 was taken out toward a setting direction (W1) through the hollow 61 defined at the shaft 60.

FIG. 2 is a side view showing a power line 70 taken out from an in-wheel motor in related art.

The power line 70 includes a three-phase (U, V, W) power line. The three-phase power line 70 is entirely taken out through a narrow hollow 61 defined at cross section of the shaft 60.

If a diameter of the power line 70 is increased to satisfy high-output, high-torque conditions, the in-wheel motor in the related art may have difficulty in taking out the power line 70 to an outside thereof due to the structure of the in-wheel motor in related art.

Further, as the diameter of the power line 70 increases, a size of the hollow 61 is increased to provide a taken-out space of the power line 70. As a result, an end of the shaft 60 becomes thinner, thereby degrading structural rigidity of the shaft 60.

Therefore, there is a need for a technical solution to not degrade the structural rigidity of the shaft 60 even if the diameter of the power line 70 is increased to provide a high-output, high-torque in-wheel motor.

As a related art document, CN001098191C discloses an electric wheel hub assembly. The electric wheel hub assembly in the related art discloses a power line being taken out to an end of a shaft.

However, as a size of an end of the shaft is determined by standard, it is difficult to increase the size of the end of the shaft. For this reason, when the diameter of the power supply line is increased to meet high-output, high-torque conditions, it is difficult to take out the power line.

In addition, there is a difficulty in processing a hole in the shaft in a diagonal direction and reliability against vibration is deteriorated. Furthermore, performing waterproof and dustproof functions using a bond has a problem in durability and product reliability may be degraded.

RELATED ART DOCUMENT (Patent Document 1) CN001098191C

SUMMARY OF THE DISCLOSURE

The present disclosure provides an in-wheel motor capable of not degrading structural rigidity of a shaft even when a diameter of a power line is increased to provide a high-power, high-torque in-wheel motor.

The present disclosure also provides an in-wheel motor capable of increasing the diameter of the power line to provide a high-power, high-torque in-wheel motor as well as improving overall structural rigidity of each of a shaft and a bearing.

The present disclosure further provides an in-wheel motor having a structure in which a power line the diameter of which is increased to provide a high-output, high-torque in-wheel motor may be easily taken out of a shaft and improvements in waterproof and dustproof functions.

The objects of the present disclosure are not limited to the above-mentioned objects, and other objects and advantages of the present disclosure which are not mentioned may be understood by the following description and more clearly understood based on the embodiments of the present disclosure. It will also be readily understood that the objects and the advantages of the present disclosure may be implemented by features defined in claims and a combination thereof.

According to an aspect of the present disclosure, there may be provided an in-wheel motor capable of not degrading structural rigidity of the shaft even when the diameter of a power line is increased to provide a high-power, high-torque in-wheel motor.

In addition, according to an aspect of the present disclosure, there may be provided an in-wheel motor capable of increasing the diameter of a power line to provide a high-power, high-torque in-wheel motor as well as improving the overall structural rigidity of each of a shaft and a bearing.

In addition, according to an aspect of the present disclosure, there may be provided an in-wheel motor having improvement in waterproof and dustproof functions.

An in-wheel motor according to an embodiment of the present disclosure includes a rim, a shaft, a motor assembly, a cover, and a bearing.

The tire may surround and be coupled to the outer ring of the rim.

The shaft may be connected to the rim through the center of the rim.

The motor assembly includes a stator connected and coupled to the shaft in the rim, and a rotor surrounding the stator and rotated around the stator.

The cover may be coupled to an opening of the rim to block the motor assembly disposed inside the rim from the outside of the rim and have a center through which the shaft may pass.

A bearing is positionally constrained at an inside of the cover and may contact and support the shaft.

For the in-wheel motor according to an embodiment of the present disclosure, the shaft includes a first shaft body and a second shaft body to take out the power line through an inner diameter portion of the bearing without degrading the rigidity of the shaft.

The first shaft body may extend outward through the center of each of the rim and the cover.

The second shaft body has a diameter larger than that of the first shaft body and may be disposed between the stator and the bearing.

In this case, a power line for supplying power to the motor assembly and a sensor line may be inserted in a radial direction of the second shaft body between the stator and the bearing, and may be taken out in a longitudinal direction of the second shaft body.

The second shaft body may have a first end defining a stator press-fit surface to which the stator is press-fit and a second end defining a bearing contact surface to which the bearing contacts.

In addition, the second shaft body includes a first hole disposed between the stator press-fit surface and the bearing contact surface and defined in a radial direction of the second shaft body to insert the power line taken out from the stator.

In addition, the second shaft body includes a second hole intersecting with the first hole and defined in a longitudinal direction of the second shaft body to take out the power line inserted through the first hole.

In this case, the second hole may be spaced apart from the first shaft body by a predetermined distance and may be defined at a position close to the inner diameter of the bearing.

In addition, the second shaft body may have a power line-taken-out path through which the power line passes through and is taken out in an L-shaped shape.

The power line-taken-out path includes a first power line-taken-out path into which the power line is inserted in the radial direction of the second shaft body through the first hole and a second power line-taken-out path intersecting with the power line-taken-out path and in which the power line is inserted in a longitudinal direction of the second shaft body from an end of the first power line-taken-out path and is taken out through the second hole.

In addition, the second shaft body includes a groove defined along an outer edge of the second hole, and an O-ring inserted into the groove.

In addition, the in-wheel motor according to an embodiment of the present disclosure further includes a sealing cap coupled to a surface of the second shaft body to block the O-ring disposed between the second shaft body and the sealing cap.

The sealing cap has a center through which the first shaft body protrudes and has a larger diameter than that of the second shaft body to block the second shaft body from outside. Accordingly, excellent long-term waterproof and dustproof performance may be achieved in contrast to an epoxy bonding methods in the related art, thereby increasing a product lifespan and preventing product failure.

The power line may be a three-phase power line. Each of the first hole and the second hole may have an area having a diameter larger than a total diameter of the three-phase power line.

The second hole may be spaced apart from the first shaft body, defined at a cross section of the second shaft body, and have an arc-shape.

In this case, a length of the arc of the second hole may be larger than the total diameter of the three-phase power line.

In addition, a width of the second hole may be larger than the diameter of each of the three-phase power lines.

For the in-wheel motor according to an embodiment of the present disclosure, the stator includes a stator core coupled to the shaft and a plurality of coils disposed on the stator core.

The stator core may be press-fitted and coupled to the stator press-fit surface.

In addition, the second shaft body includes a first protrusion protruding outward from the stator press-fit surface, having an annular shape, and configured to support at least one surface of the stator core when the stator core is press-fitted to the stator press-fit surface.

Further, the second shaft body includes a second protrusion protruding outward from the bearing contact surface, having an annular shape, and configured to support at least one surface of the bearing.

In addition, the in-wheel motor according to an embodiment of the present disclosure includes a first bearing disposed between the motor assembly and the first shaft body and a second bearing disposed between a side body of the rim and the first shaft body.

In this case, the bearing contacting the bearing contact surface provided at the second end of the second shaft body may have an inner diameter that is larger than that of each of the first bearing and the second bearing. As the size of the bearing increases, a lifespan of the bearing is increased. Stiffness of the bearing is improved, thereby improving durability.

An in-wheel motor according to another embodiment of the present disclosure includes a rim, a shaft, a motor assembly, a gear assembly, a cover, and a bearing. The shaft includes the first shaft body and the second shaft body. The power line may be inserted in a radial direction of the second shaft body between the stator and the bearing, and may be taken out in a longitudinal direction of the second shaft body.

For the in-wheel motor according to another embodiment of the present disclosure, a gear assembly includes a sun gear, a planetary gear, and a carrier.

The sun gear may be disposed on a same centerline as the rotor. A plurality of planetary gears may be provided to surround a periphery of the sun gear. The carrier may have a frame shape and connect the plurality of planetary gears.

According to the present disclosure, the structural rigidity of the shaft may not be deteriorated even when the diameter of the power line is increased to provide a high-output, high-torque in-wheel motor.

Specifically, the inner diameter of the bearing is increased and the diameter of a portion of the shaft is increased to provide a power line-taken-out space and not to degrade the structural rigidity of the shaft.

In addition, as the size of the bearing is increased, a lifespan of the bearing is increased. Further, stiffness of the bearing is improved, thereby improving durability thereof.

In addition, the size of the shaft increases and a number of hollows defined in the shaft is increased. Therefore, the in-wheel motor may have weight reduction and improve ride comfort.

In addition, the degradation of the rigidity of the shaft may be prevented, which results from defining a hollow at a cross-section of the shaft, thereby advantageously obtaining overall rigidity of the shaft.

In addition, according to the present disclosure, in contrast to other structures sealing the taken-out portion using the epoxy bond or the like, the O-ring and the sealing cap are used at the taken-out portion of the power line, thereby significantly improving the waterproof and dustproof functions.

Hereafter, further effects of the present disclosure, in addition to the above-mentioned effect, are described together while describing specific matters for implementing the present disclosure.

DETAILED DESCRIPTION OF EXEMPLARY IMPLEMENTATIONS

Figure 1:
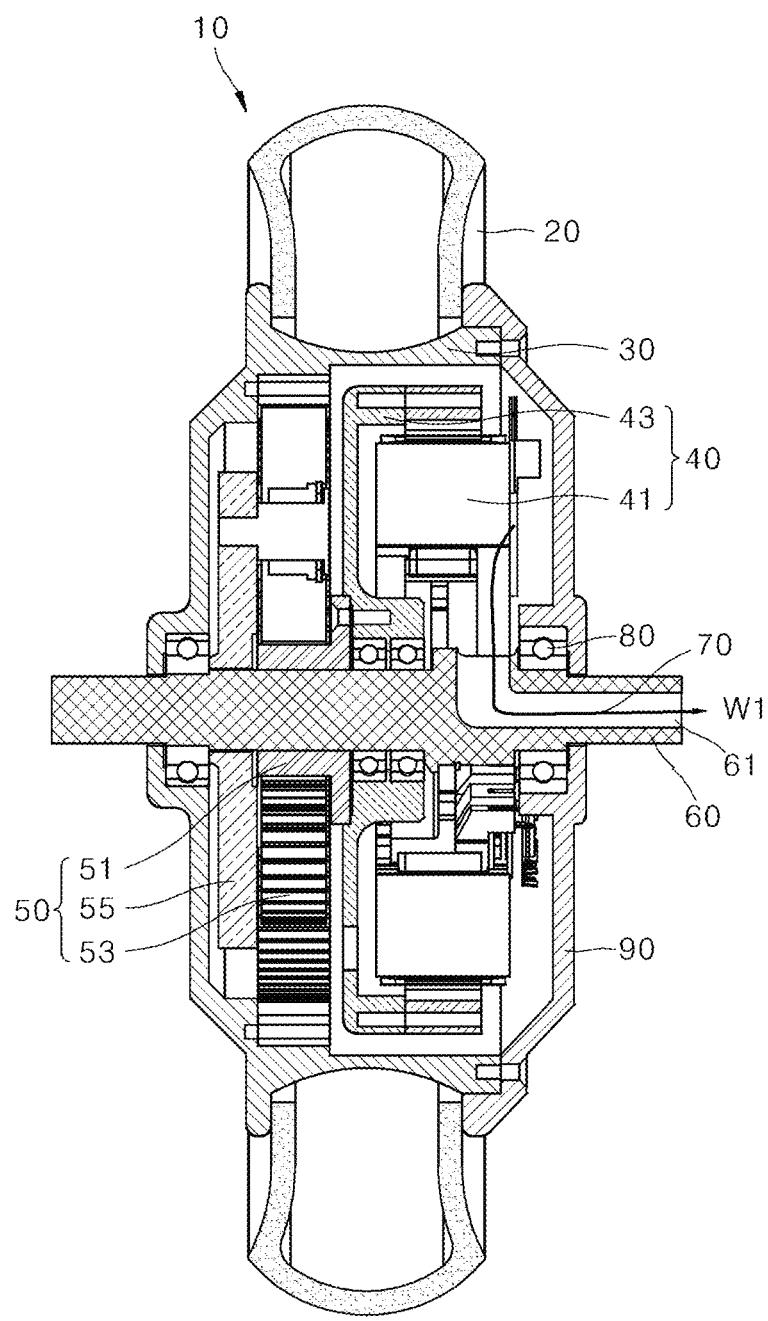
FIG. 1 is a schematic cross-sectional view showing an in-wheel motor in related art.
Figure 2:
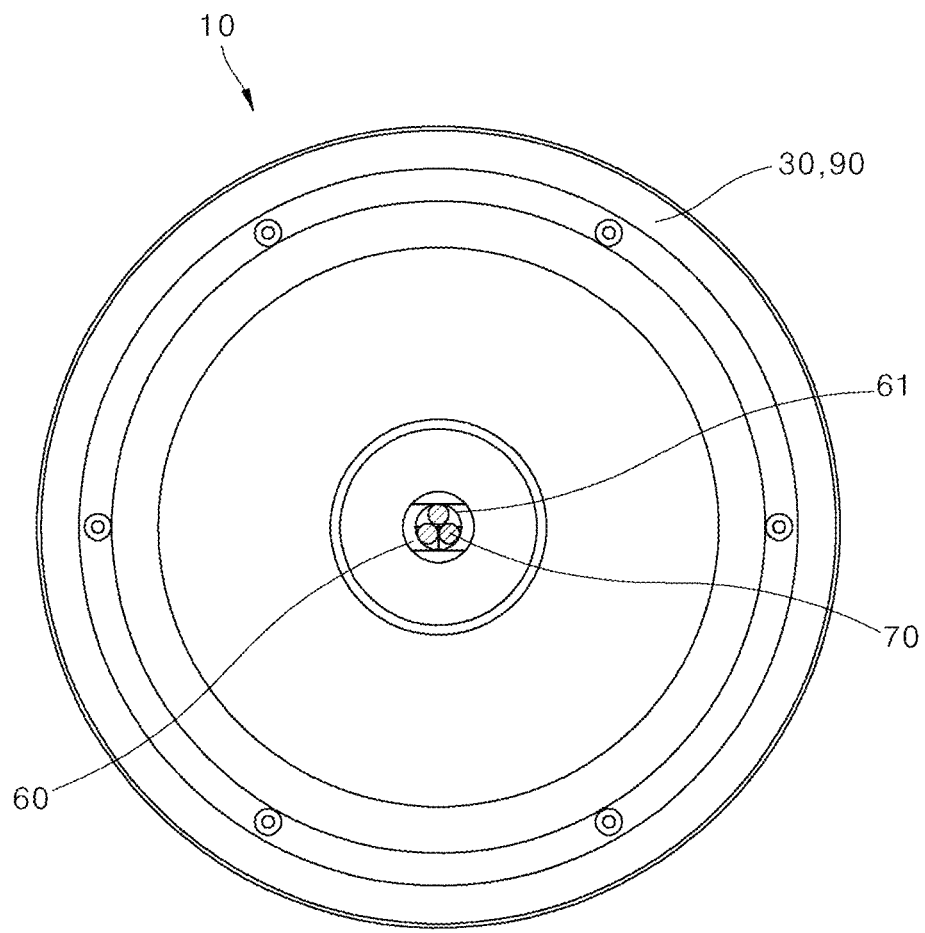
FIG. 2 shows a power line-taken-out structure of an in-wheel motor in related art.

Some embodiments of the present disclosure will be described in detail with reference to the accompanying drawings, such that a person having ordinary knowledge in the art to which the present disclosure pertains may easily implement the technical idea of the present disclosure. The present disclosure may, however, be embodied in different manners and should not be construed as limited to example embodiments set forth herein.

A description not relating to the present disclosure is omitted to clearly describe the present disclosure and same reference numerals can be used to refer to same or similar components throughout the disclosure. Further, some embodiments of the present disclosure are described in detail with reference to exemplary drawings. Reference now should be made to the drawings, in which the same reference numerals are used throughout the different drawings to designate the same or similar components. Further, a detailed description of a well-known configuration or function relating to the present disclosure may be omitted if it unnecessarily obscures the gist of the present disclosure.

Further, the terms "connected," "coupled," or the like are used such that, where a first component is connected or coupled to a second component, the first component may be directly connected or able to be connected to the second component, or one or more additional components may be disposed between the first and second components, or the first and second components may be connected or coupled through one or more additional components.

Hereinafter, an in-wheel motor according to an embodiment of the present disclosure is described in detail with reference to accompanying drawings.

In-Wheel Motor

Figure 3:
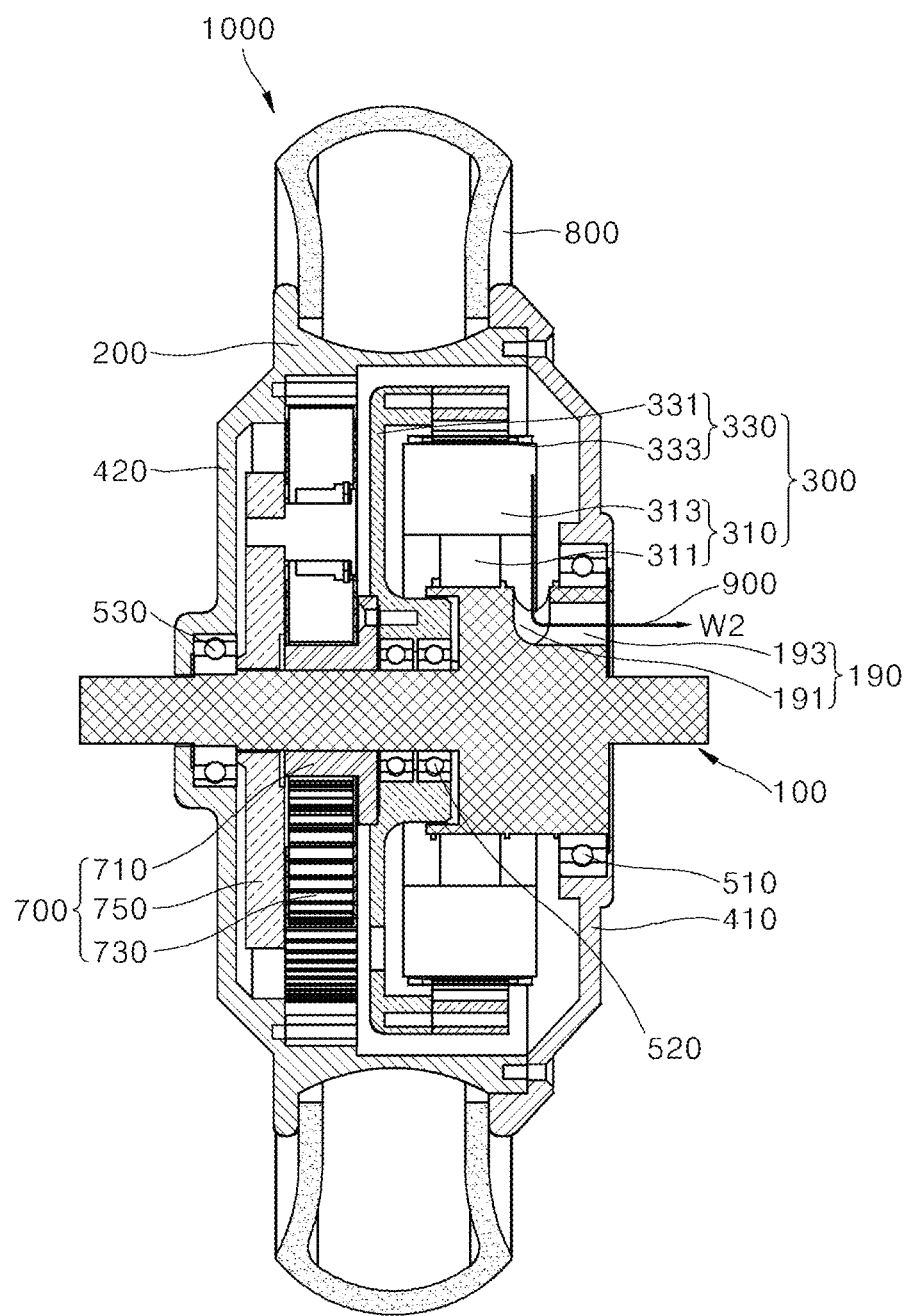
FIG. 3 is a schematic cross-sectional view showing an example in-wheel motor.
Figure 4:
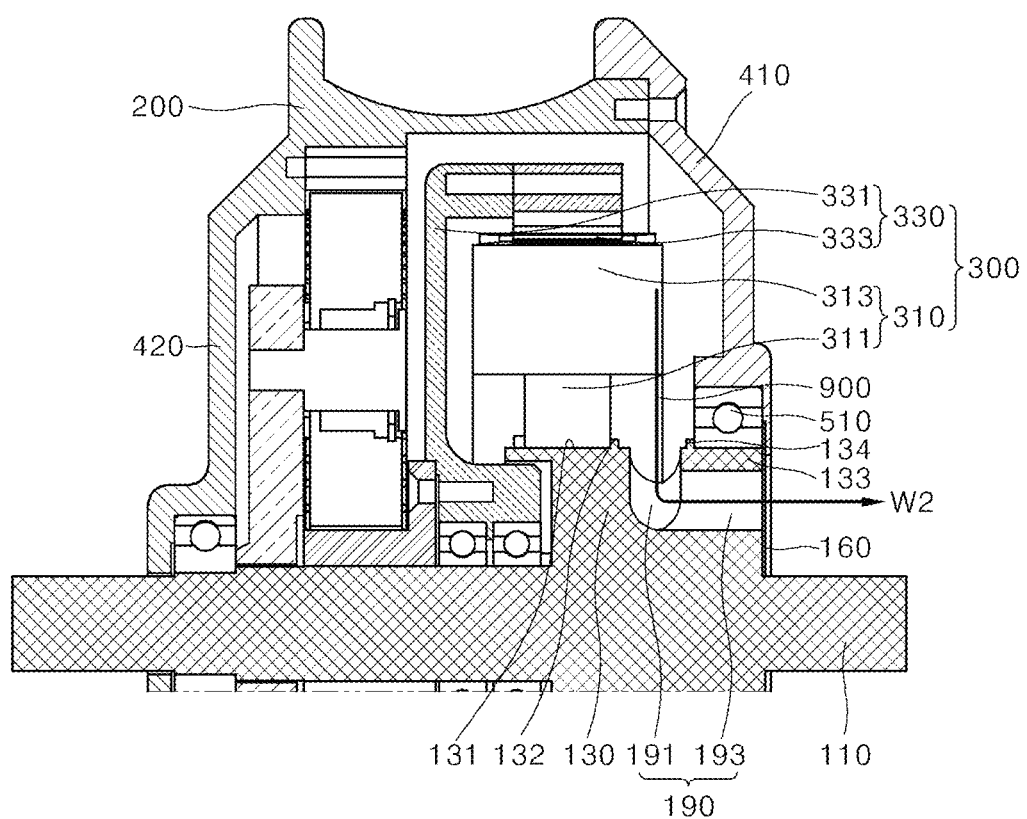
FIG. 4 is an enlarged view showing an example power line-taken-out structure of an in-wheel motor.

FIG. 3 is a schematic cross-sectional view showing an example in-wheel motor. FIG. 4 is an enlarged view of a portion of an in-wheel motor corresponding to a power line-taken-out structure.

An in-wheel motor 1000 according to an embodiment of the present disclosure is a high-power, high-torque in-wheel motor and may not reduce structural rigidity of the shaft 100 even when a diameter of a power line 900 is increased.

In particular, the in-wheel motor 1000 according to an embodiment of the present disclosure may increase a size of each of the shaft 100 and a bearing 510 supporting the shaft 100, thereby significantly improving structural rigidity thereof.

In addition, the in-wheel motor 1000 according to an embodiment of the present disclosure may have greater improvement in waterproof and dustproof functions.

The in-wheel motor 1000 according to an embodiment of the present disclosure includes a shaft 100, a rim 200, a motor assembly 300, a cover 410, and a bearing 510.

In addition, the in-wheel motor 1000 according to the embodiment of the present disclosure may further include a gear assembly 700.

The shaft 100 may include at least two bodies 110 and 130 having different diameters such that a power line 900 having increased diameter is taken out through an area having an inner diameter of the bearing 510 without deteriorating its structural rigidity.

The two bodies 110 and 130 may be referred to as a first shaft body 110 and a second shaft body 130.

The first shaft body 110 may pass through a center of each of the rim 200 and the cover 410 and protrudes from both sides of the in-wheel motor 1000 by a predetermined length.

The first shaft body 110 may have a shape and a diameter corresponding to a shape and a diameter of the shaft 60 (see FIG. 1) of the in-wheel motor 10 in the related art (see FIG. 1).

The in-wheel motor 10 in the related art (see FIG. 1) includes a hollow 61 defined at the shaft 60 to take out the power line 70 (see FIG. 1), but the first shaft body 110 according to the embodiment of the present disclosure does not include the hollow 61.

Therefore, the overall rigidity of the shaft 100 may not be degraded, and rather, the rigidity of the shaft 100 may be significantly improved due to the structure of the second shaft body 130.

The second shaft body 130 is an example component of the shaft 100 and has a larger diameter than that of the first shaft body 110.

The second shaft body 130 may be disposed between the stator 310 (e.g., a stator core 311) and a bearing 510.

As the second shaft body 130 has a larger diameter than that of the first shaft body 110, a size of an inner diameter of the bearing 510 may be increased compared to other bearings. Therefore, the rigidity of the bearing 510 is improved, a lifespan of the bearing 510 is increased, and durability of the bearing 510 is improved.

A power line 900 refers to a line taken out from an inside of the in-wheel motor 1000 to an outside of the in-wheel motor 1000 to supply power to the motor assembly 300 (e.g., the stator 310).

The power line 900 may include a line supplying power to a sensor (e.g., a Hall sensor) of the in-wheel motor 1000.

The power line 900 is inserted between the stator 310 and the bearing 510 in a radial direction of the second shaft body 130. Subsequently, the inserted power line 900 moves in a longitudinal direction of the second shaft body 130. Thereafter, as shown in FIG. 3, the power line 900 is taken out to outside through a space having the inner diameter of the bearing 510 at a position spaced apart from the first shaft body 110.

According to an embodiment of the present disclosure, the power line 900 with an increased diameter may be taken out to the outside of the in-wheel motor 1000 without degrading the rigidity of the first shaft body 110 corresponding to the shaft 60 in the related art (see FIG. 1).

Figure 5:
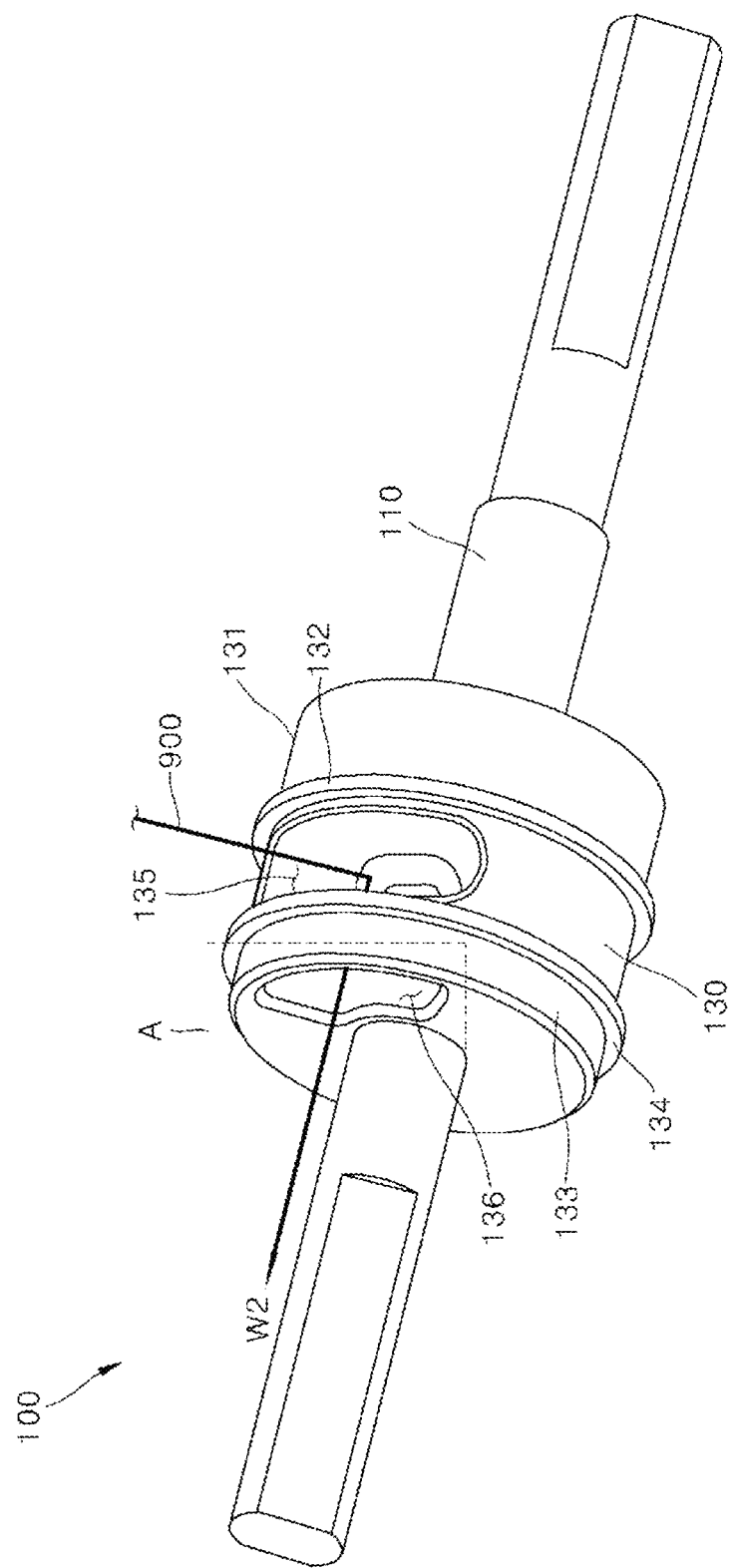
FIG. 5 is a schematic perspective view showing an example shaft of an in-wheel motor.
Figure 6:
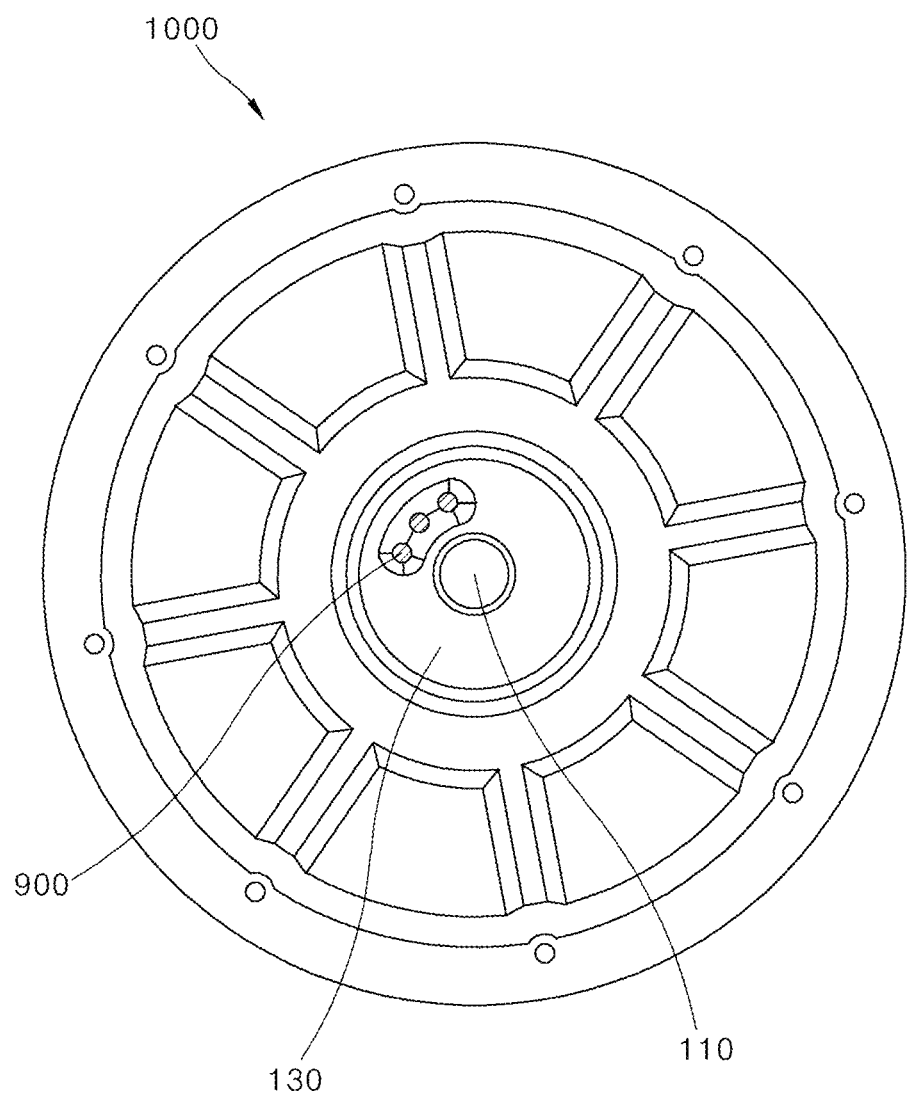
FIG. 6 is a side view showing an example power line-taken-out structure of an in-wheel motor.
Figure 7:
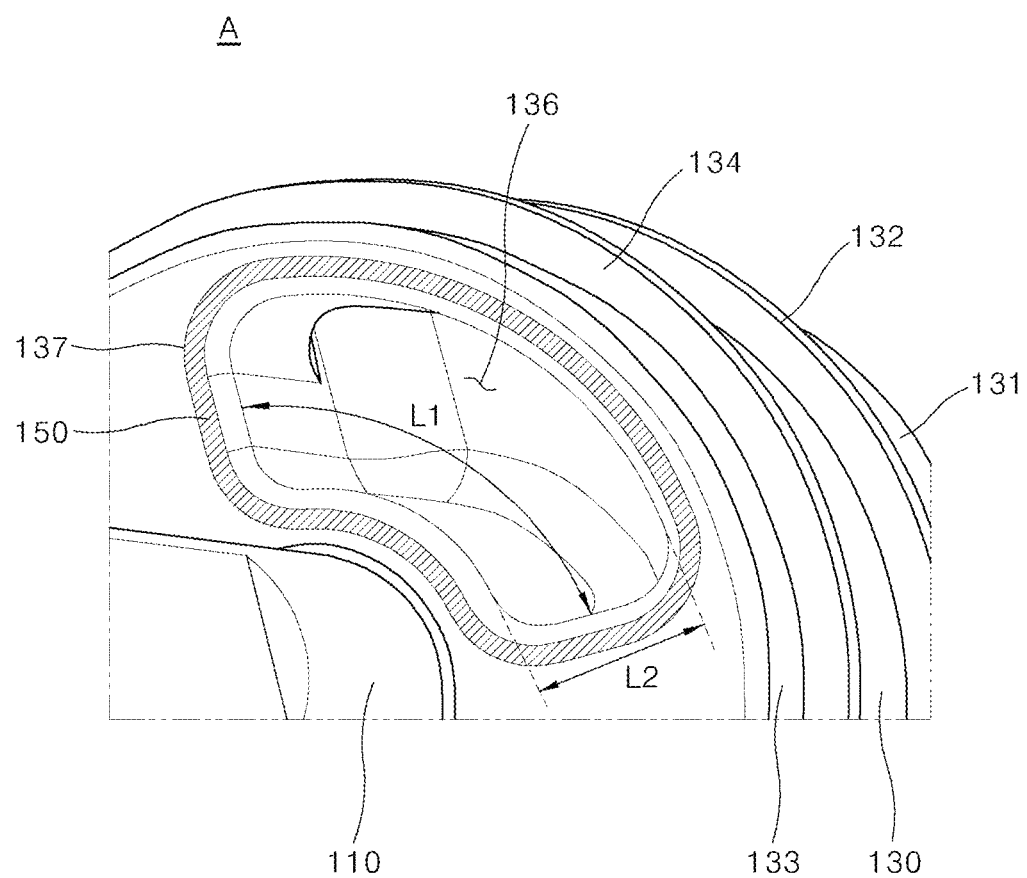
FIG. 7 is an enlarged view showing area "A" of FIG. 5.

Components of the shaft 100 for obtaining the power line-taken-out structure of the in-wheel motor 1000 are described along with a description with respect to FIGS. 5 to 7.

Hereinafter, the remaining components of the in-wheel motor 1000 according to an embodiment of the present disclosure except for the shaft 100 are described in detail.

The rim 200 is a circular rigid member forming a wheel. A tire 800 surrounds and is coupled to an outer ring of the rim 200. The rim 200 may further include a tire separation prevention protrusion to maintain the coupled state of the tire 800, at the outer ring thereof.

The rim 200 includes a predetermined accommodation space. A plurality of components including the shaft 100, the motor assembly 300, and the gear assembly 700 are coupled to each other and the plurality of coupled components are accommodated in the accommodating space of the rim 200.

The motor assembly 300 is disposed inside the rim 200 and surrounds and is coupled to the shaft 100.

The motor assembly 300 includes a stator 310 and a rotor 330.

The stator 310 is connected to the shaft 100. For example, the stator core 311 may be press-fitted and coupled to the second shaft body 130.

The stator 310 may receive power for driving the motor from outside through the power line 900.

The stator 310 includes a stator core 311 surrounding and press-fitted to the second shaft body 130 in the rim 200 and a plurality of coils 313. The plurality of coils 313 may be disposed in a circumferential direction along a circumference of the stator core 311.

The rotor 330 is spaced apart from the stator 310 by a predetermined distance (i.e., there is a space between the rotor 330 and the stator 310) and may surround the stator 310.

For example, the rotor 330 includes a rotor core 331 and a plurality of magnets 333. The plurality of magnets 333 are coupled to the rotor core 331 and face the plurality of coils 313 of the stator 310.

When the power is supplied to the stator 310 by the power line 900, an electromagnetic force is generated between the coil 313 of the stator 310 and the magnet 333 of the rotor 330. The rotor 330 rotates around the stator 310 based on the generated electromagnetic force.

When the rotor 330 rotates, the rim 200 connected to the rotor 330 rotates. The tire 800 mounted at the outer ring of the rim 200 rotates about the fixed shaft 100 as a central axis based on the rotation of the rim 200.

The cover 410 covers an opening defined at a side surface of the rim 200 and blocks the inside of the rim 200 from the outside of the rim 200.

The cover 410 blocks the inside of the rim 200 from the outside of the rim 200 to protect a plurality of components vulnerable to water, such as the motor assembly 300.

The cover 410 is coupled to the opening of the rim 200 and has a disk shape, and the shaft 100 is coupled through a center of the cover 410. In addition, a bearing 510 is disposed between the cover 410 and the shaft 100.

The bearing 510 is positionally constrained to contact and support the second shaft body 130 from the inside of the cover 410.

The bearing 510 reduces contact friction between the cover 410 and the shaft 100 when the cover 410 coupled to the rim 200 rotates.

The gear assembly 700 is disposed inside the rim 200 and controls a rotational speed of the rotor 330.

The gear assembly 700 includes a sun gear 710, a planetary gear 730, and a carrier 750.

The sun gear 710 has a same centerline as the rotor 330. A plurality of planetary gears 730 may be provided to surround a periphery of the sun gear 710. The carrier 750 refers to a frame member connecting the plurality of planetary gears 710.

According to an embodiment of the present, the in-wheel motor 1000 may include at least one Hall sensor substrate and the Hall sensor substrate may be disposed between the motor assembly 300 and the cover 410. For example, the Hall sensor substrate may include a plurality of Hall sensors to stably and accurately measure a magnetic force of the motor assembly 300.

The in-wheel motor 1000 according to an embodiment of the present disclosure may further include two bearings 520 and 530 (see FIG. 3) in addition to the bearing 510 disposed between the second shaft body 130 and the cover 410.

The first bearing 520 is disposed between the motor assembly 300 and the first shaft body 110 and reduces mutual contact friction.

The second bearing 530 is disposed between the side body 420 of the rim 200 and the first shaft body 110 and reduces the mutual contact friction.

As the second shaft body 130 has a larger diameter than that of the first shaft body 110, the bearing 510 in contact with the second shaft body 130 has a larger inner diameter than that of each of the first bearing 520 and the second bearing 530 in contact with the first shaft body 110.

Shaft and Power Line-Taken-Out Structure

FIG. 5 is a schematic perspective view showing an example shaft of an in-wheel motor. FIG. 6 is a side view showing an example in-wheel motor having a power line-taken-out structure. FIG. 7 is an enlarged view showing area "A" of FIG. 5.

For a shaft 100 of an in-wheel motor 1000 according to an embodiment of the present disclosure, as shown, a power line 900 having an increased diameter is taken out through a space having an inner diameter of a bearing 510 without degrading structural rigidity thereof.

The shaft 100 includes a first shaft body 110 and a second shaft boy 130 having different diameters.

The first shaft body 110 may pass through a center of each of a rim 200 and a cover 410, protrudes from both sides of the in-wheel motor 1000 by a predetermined length.

The first shaft body 110 may have a shape and a diameter corresponding to a shape and a diameter of the shaft 60 (see FIG. 1) of the in-wheel motor 10 in related art (see FIG. 1). However, the first shaft body 110 does not include the hollow 61, thereby preventing degradation in overall rigidity of the shaft 100.

The second shaft body 130 is an example component of the shaft 100 and has a diameter larger than a diameter of the first shaft body 110. The second shaft body 130 may have a diameter-increased shape such that the overall rigidity of the shaft 100 is improved.

The second shaft body 130 is disposed between the stator core 311 and the bearing 510.

The power line 900 is inserted in the radial direction of the second shaft body 130 between the stator 310 and the bearing 510, is curved in a longitudinal direction of the second shaft body 130 by 90 degrees, and is taken out to outside.

That is, the power line 900 is not taken out to outside at the first shaft body 110, but is taken out to outside through the second shaft body 120 disposed at the inner diameter of the bearing 510 (see FIG. 4).

Therefore, even if the diameter of the power line 900 is increased to satisfy the high-power and high-torque performance of the in-wheel motor 1000, the power line 900 is taken out only through the second shaft body 130, and thus, the rigidity of the first shaft body 110 is not degraded.

Referring to FIG. 5, the second shaft body 130 has a first end defining a stator press-fit surface 131 into which the stator core 311 is press-fit.

In addition, the second shaft body 130 has a second end defining the bearing contact surface 133 to which the bearing 510 contacts.

Referring to FIG. 4, a structure in which the stator core 311 is press-fitted into the stator press-fit surface 131 and the structure in which the bearing 510 contacts the bearing contact surface 133.

The second shaft body 130 includes a first hole 135 and a second hole 136 to provide a structure in which the power line 900 is taken out.

Specifically, the first hole 135 is defined between the stator press-fit surface 131 and the bearing contact surface 133 and penetrates a circumference of the second shaft body 130, that is, an outer circumferential surface of the second shaft body 130.

For example, the first hole 135 may be defined in the radial direction of the second shaft body 130 in order for the power line 900 taken out from the stator 310 (see FIG. 4) to be inserted through the first hole 135.

The second hole 136 intersects with the first hole 135 and is defined at a side of the second shaft body 130. The second hole 136 may be defined in the longitudinal direction of the second shaft body 130 to take out the power line 900 inserted through the first hole 135.

In this case, the second hole 136 may be spaced apart from the first shaft body 110 and defined at a position near the inner diameter of the bearing 510 (see FIG. 4).

According to this structure, the power line 900 may be taken out to an outside thereof through the second hole 136, and thus, the rigidity of the first shaft body 110 may not be degraded. Further, even when the diameter of the power line 900 is increased, the size of the second hole 136 may be easily increased using the second shaft body 130. As a result, the in-wheel motor may have a power line-taken-out structure for achieving high-output, high-torque performance.

The second shaft body 130 may include a power line-taken-out path 190 (see FIG. 4) through which the power line 900 passes and is taken out in an L-shape.

Referring to FIG. 4, the power line-taken-out path 190 includes a first power line-taken-out path 191 and a second power line-taken-out path 193.

The first power line-taken-out path 191 refers to a longitudinal path through which the power line 900 is inserted through the first hole 135 (see FIG. 5) in the radial direction of the second shaft body 130.

The second power line-taken-out path 193 intersects with the first power-taken-out path 191 and is defined in a horizontal direction.

The second power line-taken-out path 193 refers to a path through which the power line 900 passes in the longitudinal direction of the second shaft body 130 from an end of the first power line-taken-out path 191 and is taken out in an outward direction (W2) through the second hole 136 (see FIG. 5).

Referring to FIG. 7, the second shaft body 130 includes a groove 137 defined along an outer edge of the second hole 136.

The groove 137 may have a shape corresponding to that of the second hole 136, may be disposed near an edge of the second hole 136, and may have a predetermined depth.

At least a portion of an O-ring 150 as an additional sealing means is inserted into the groove 137 defined at the outer portion of the second hole 136 to improve the waterproof and dustproof functions.

The O-ring 150 may be made of various materials and have various shapes. Therefore, the present disclosure is not limited to the shape of the illustrated O-ring 150 and various shapes of O-ring that are obvious to those skilled in the art may be used without limitation.

In addition, a plurality of grooves 137 may be provided. Although not shown, the plurality of grooves 137 may be defined outside of the second hole 136 and spaced apart from one another by a predetermined distance. In addition, each of the plurality of O-rings 150 is partially inserted into one of the plurality of grooves 137 to further improve the waterproof and dustproof performance.

Figure 8:
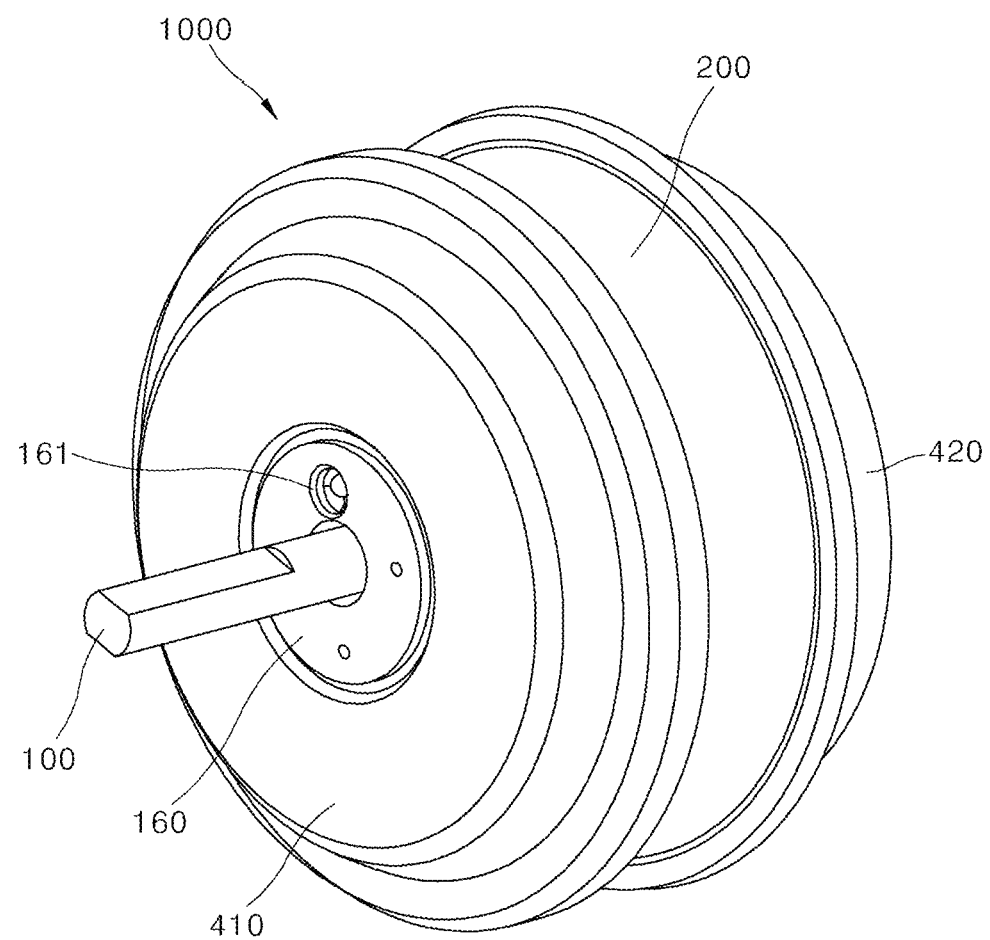
FIG. 8 is a perspective view showing an example sealing cap used for an in-wheel motor.

Referring to FIG. 8, the second shaft body 130 according to an embodiment of the present disclosure may further include a sealing cap 160.

The sealing cap 160 is coupled to a surface of the second shaft body 130 defining the second hole 136 (see FIG. 7) to block the O-ring 150 (see FIG. 7) disposed between the second shaft body and the sealing cap, and has a disk-shaped member.

For example, the sealing cap 160 includes a hole at a center thereof, the first shaft body 110 passes through the central hole, and protrudes from a side surface of the in-wheel motor 1000.

In addition, the sealing cap 160 has a diameter larger than that of the second shaft body 130 to cover the side surface of the second shaft body 130 and blocks the side surface of the second shaft body 130 from an outside thereof.

The second shaft body 120 having the power line-taken-out structure may be structurally completely sealed using the O-ring 150 and the sealing cap 160 to achieve excellent waterproof and dustproof performance for a long time compared to using an epoxy bond. In addition, the O-ring 150 may be replaced as necessary, thereby improving product durability and reliability.

For the in-wheel motor 1000 according to an embodiment of the present disclosure, the power line 900 may include a three-phase (i.e., U, V, W) power line (see FIG. 6).

Referring to FIG. 5, each of the first hole 135 and the second hole 136 may have an area with a diameter larger than a total diameter of the three-phase power line 900. Accordingly, even when the diameter of the power line is increased, the power line 900 may be easily taken out to outside through the first hole 135 and the second holes 136 defined at the second shaft body 130.

As a specific example, referring to FIG. 7, the second hole 136 has an arc-shape, is not defined at a protruding portion of the first shaft body 110, but defined at a cross-section of the second shaft body 130.

If the second hole 136 has an arc-shape, a length (L1) of the arc of the second hole 136 may be larger than a sum of the diameters of the three-phase power line 900 (see FIG. 6). In addition, a width (L2) of the second hole 136 may be larger than the diameter of each of the three-phase power lines 900 (see FIG. 6).

Accordingly, the three-phase power line 900 (see FIG. 6) may be taken out to outside through the second hole 136. In addition, if the diameter of the power line is further increased as necessary, the length and the width of the arc of the second hole 136 may be increased.

In addition, when a number of power lines are changed or the diameter of the power line is changed as necessary, a number of second holes 136 may be added and a plurality of second holes 136 may be provided.

Referring to FIG. 7, the second shaft body 130 includes a first protrusion 132 and a second protrusion 134.

The first protrusion 132 has an annular shape and protrudes outward from the stator press-fit surface 131. Referring to FIG. 4, the first protrusion 132 supports at least a portion of the stator core 311 when the stator core 311 is press-fit into the stator press-fit surface 131, thereby improving structural stability thereof.

The second protrusion 134 has an annular shape and protrudes outward from a bearing contact surface 133. Referring to FIG. 4, the second protrusion 134 supports at least a portion of the bearing 510 when the bearing 510 contacts the bearing contact surface 133 and accurately guides the contact position of the bearing 510, thereby improving assembly precision and structural stability thereof.

According to an embodiment of the present disclosure, the in-wheel motor may increase the diameter of the power line to achieve the high-output, high-torque performance of the in-wheel motor. Furthermore, the all components may have simple assembly structure, thereby improving assembly convenience. In addition, the second shaft body 130 has the increased diameter and the bearing 510 has the increased inner diameter, thereby improving the structural rigidity thereof and improving the waterproof and dustproof functions using the O-ring 150 and the sealing cap 160.

Figure 9:
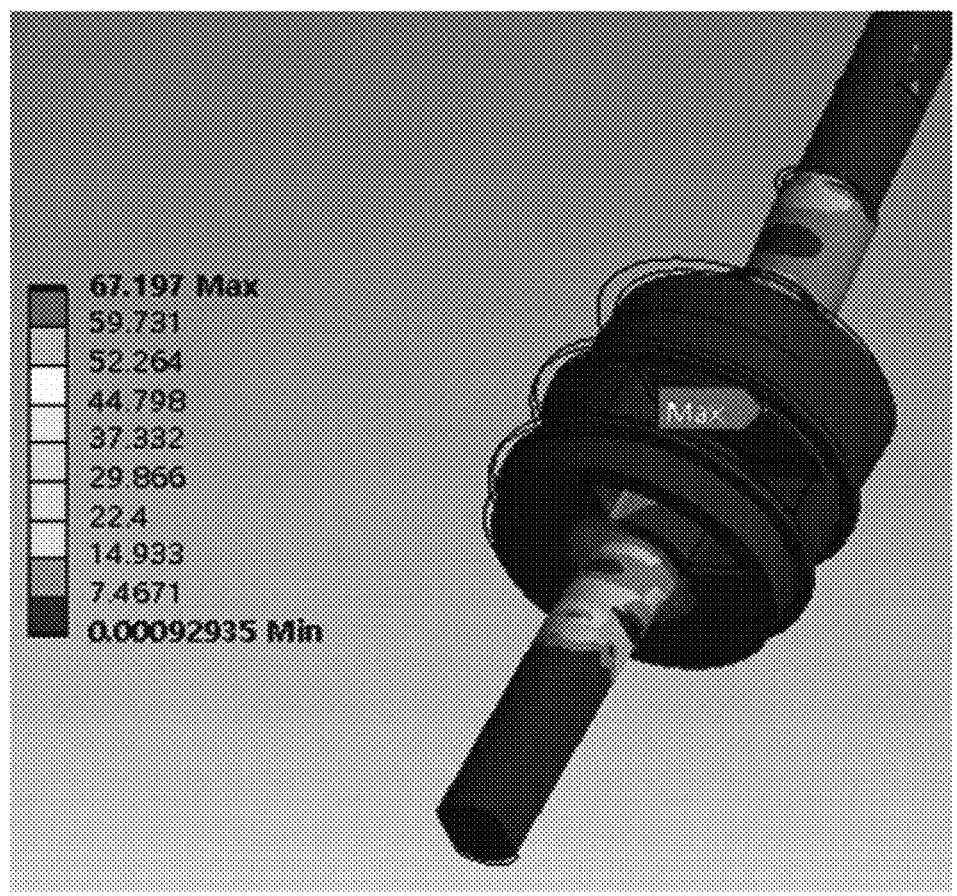
FIG. 9 is an image showing an example impact load analysis result of an in-wheel motor.
Figure 10:
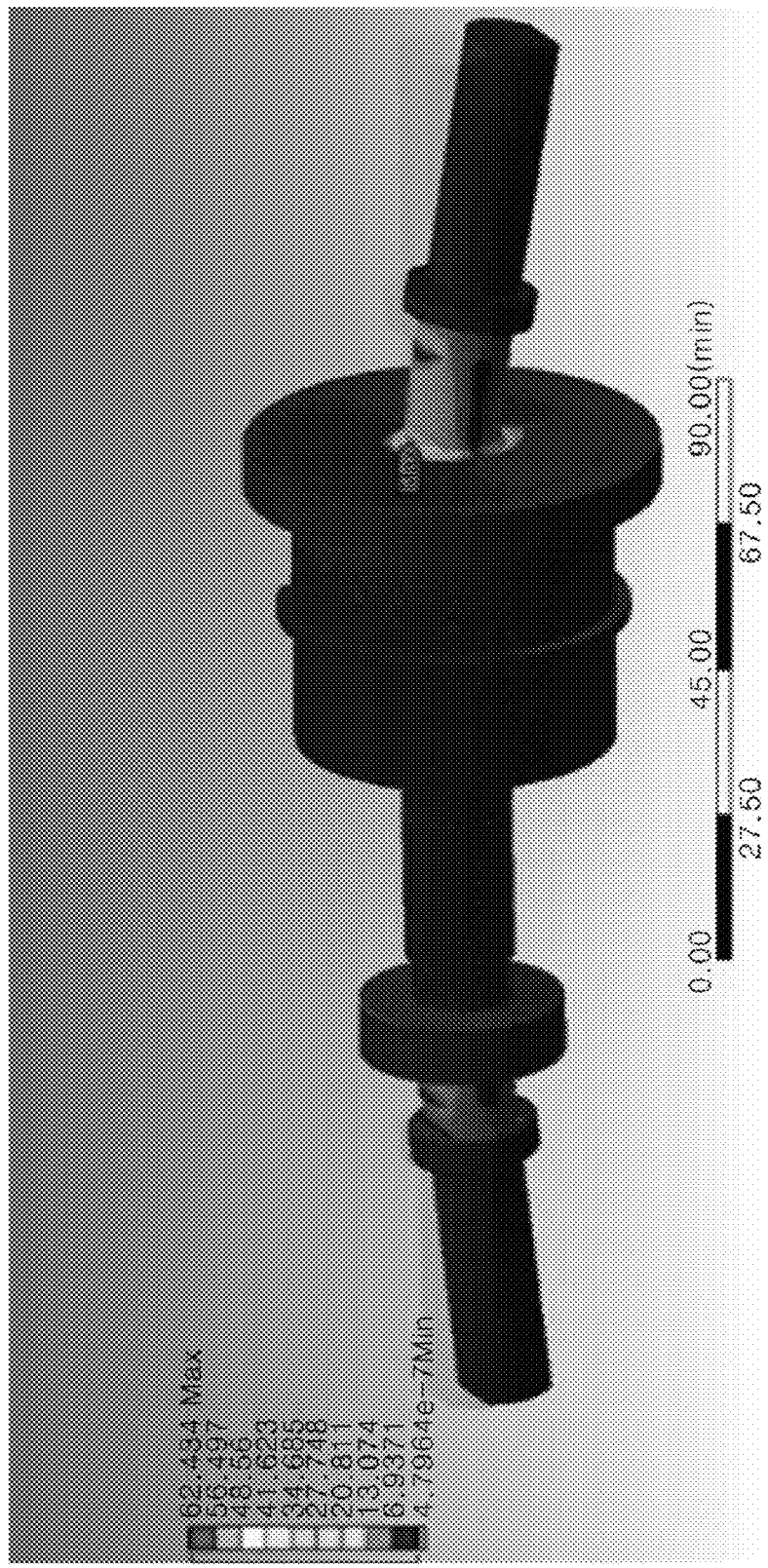
FIG. 10 is an image of an example static load analysis result of an in-wheel motor.

FIGS. 9 and 10 show a result of stiffness analysis of an in-wheel motor of the present disclosure.

Referring to FIG. 9, the illustrated analysis result image shows an impact load analysis result for a shaft 100 of an in-wheel motor manufactured according to an embodiment of the present disclosure.

When an impact load of 50G is applied to the shaft 100 of the in-wheel motor manufactured according to an embodiment of the present disclosure, the shaft 100 of the in-wheel motor manufactured according to an embodiment of the present disclosure has a pressure of a Max 67.2 Mpa, which corresponds to 5.1 times of standard safety factor of a material, for example, SM45c. Therefore, sufficient rigidity of the shaft 100 of the in-wheel motor manufactured according to an embodiment of the present disclosure is obtained.

Referring to FIG. 10, the illustrated analysis result image shows a static load analysis result for a shaft 100 of an in-wheel motor manufactured according to an embodiment of the present disclosure.

When a vertical load of 1200 N is applied to the shaft 100 of the in-wheel motor manufactured according to an embodiment of the present disclosure, the shaft 100 of the in-wheel motor manufactured according to an embodiment of the present disclosure has a pressure of a Max 62.4 MPa, which corresponds to 5.5 times of a standard safety factor of a material, for example, SM45C. Therefore, sufficient rigidity of the shaft 100 of the in-wheel motor manufactured according to an embodiment of the present disclosure is obtained.

The in-wheel motor 1000 according to an embodiment of the present disclosure may take out the power line to outside and the rigidity of the shaft 100 may be further improved even when the diameter of the power line is increased.

According to the configurations and the operations of the present disclosure, even when the diameter of the power line is increased to implement the high-power, high-torque in-wheel motor, the structural rigidity of the shaft may not be degraded.

Particularly, the inner diameter of the bearing is increased and the diameter of a portion of the shaft is increased such that the power line having the increased diameter may be smoothly taken out to outside without degrading the rigidity of the shaft.

Furthermore, as the size of the bearing is increased, a lifespan of the bearing is increased and the rigidity of the bearing may be improved. Thus, the durability of the bearing may be improved.

Furthermore, the size of the shaft increases and a number of hollows defined in the shaft increases, thereby reducing weight of the in-wheel motor and improving ride comfort. In addition, weight-reduction processing such as providing a hollow at the cross-section of the shaft may not be performed, thereby preventing degradation of the shaft.

In addition, in contrast to sealing the taken-out portion using the epoxy bond in the related art, the in-wheel motor according to the configuration and the operation of the present disclosure may dispose the O-ring at the taken-out portion of the power line and use the sealing cap to entirely cover the second shaft body. Therefore, even when used for a long period of time, the in-wheel motor according to the present disclosure may obtain the excellent waterproof and dustproof functions, thereby increasing a product lifespan.

While the present disclosure has been described with reference to the embodiments shown in the drawings, it will be understood that it is merely illustrative and many variations and equivalent other embodiment are possible from the above for those skilled in the art. Therefore, the true technical protection scope of the present disclosure should be defined by claims below.

DESCRIPTION OF SYMBOLS

100: Shaft
110: First shaft body
130: Second shaft body
131: Stator press-fit surface
132: First protrusion
133: Bearing contact surface
134: Second protrusion
135: First hole
136: Second hall
137: Groove
150: O-ring
160: Sealing cap
190: Power line-taken-out path
191: First power line-taken-out path
193: Second power line-taken-out path
200: Rim
300: Motor assembly
310: Stator
311: Stator core
313: Coil
330: Rotor
331: Rotor core
331: Magnet
410: Cover
420: Side body
510: Bearing
520: First bearing
530: Second bearing
700: Gear assembly
710: Sun gear
730: Planetary gear
750: Carrier
800: Tire
900: Power line
1000: In-wheel motor

What is claimed is:

1. An in-wheel motor, comprising:
a circular rim having an outer ring capable of coupling to a tire;
a shaft connected to the rim through a center of the rim;
a motor assembly comprising a stator connected to the shaft in the rim and a rotor surrounding the stator to rotate about the stator;
a cover coupled to an opening of the rim to block the motor assembly disposed inside the rim from an environment outside of the rim and having a center through which the shaft passes; and
a bearing positionally constrained to an inside of the cover and supporting the shaft,
wherein the shaft comprises:
a first shaft body passing through the center of each of the rim and the cover and extending outward from the rim; and
a second shaft body having a larger diameter than a diameter of the first shaft body, and
wherein a power line for supplying power to the motor assembly is inserted into the second shaft body between the stator and the bearing in a radial direction and is extended in a longitudinal direction of the second shaft body,
wherein the second shaft body comprises:
a first end portion defining a stator contact surface to which the stator contacts; and
a second end portion defining a bearing contact surface to which the bearing contacts,
wherein the second shaft body comprises:
a first hole defined between the stator contact surface and the bearing contact surface, defined in the radial direction of the second shaft body in which the power line from the stator is inserted, and
a second hole intersecting with the first hole and defined in the longitudinal direction of the second shaft body to take out the power line inserted through the first hole,
wherein the second hole is spaced apart from the first shaft body and is defined at a position closer to an inner diameter of the bearing than the first shaft body.

2. The in-wheel motor of claim 1, wherein the second shaft body comprises a power line-taken-out path through which the power line passes in an L shape in the second shaft body and is taken out of the second shaft body.

3. The in-wheel motor of claim 2, wherein the power line-taken-out path comprises:
a first power line-taken-out path through which the power line is inserted in the radial direction into the second shaft body through a first hole of the second shaft body; and
a second power line-taken-out path intersecting with the first power line-taken-out path and through which the power line is inserted in the longitudinal direction of the second shaft body from an end of the first power line-taken-out path and is taken out through a second hole of the second shaft body.

4. The in-wheel motor of claim 1, wherein the second shaft body comprises:
a groove defined along an outer edge of the second hole; and
an O-ring inserted into the groove.

5. The in-wheel motor of claim 4, further comprising a sealing cap coupled to a surface of the second shaft body to block the O-ring disposed between the second shaft body and the sealing cap,
wherein the sealing cap has a center through which the first shaft body passes and has a larger diameter than a diameter of the second shaft body to block the second shaft body from the environment outside of the rim.

6. The in-wheel motor of claim 1,
wherein the power line is a three-phase power line, and
wherein each of the first hole and the second hole has an area having a diameter larger than a diameter of the three-phase power line.

7. The in-wheel motor of claim 1,
wherein the second hole is spaced apart from the first shaft body and has an arc shape,
wherein a length of the arc is greater than the diameter of the three-phase power line, and
wherein a width of the arc is greater than a diameter of each line of the three-phase power line.

8. The in-wheel motor of claim 1,
wherein the stator comprises:
a stator core coupled to the shaft; and
a plurality of coils disposed on the stator core, and
wherein the stator core is press-fitted and coupled to the stator contact surface.

9. The in-wheel motor of claim 8, wherein the second shaft body comprises a first protrusion protruding outward from the stator contact surface and having an annular shape to support at least one surface of the stator core when the stator core is press-fitted to the stator contact surface.

10. The in-wheel motor of claim 1, wherein the second shaft body comprises a second protrusion protruding outward from the bearing contact surface and having an annular shape to support at least one surface of the bearing.

11. The in-wheel motor of claim 1, comprising:
a first bearing disposed between the motor assembly and the first shaft body; and
a second bearing disposed between a side body of the rim and the first shaft body.

12. The in-wheel motor of claim 11, wherein the bearing has an inner diameter that is greater than an inner diameter of each of the first bearing and the second bearing.

13. An in-wheel motor, comprising:
a circular rim having an outer ring surrounded by and coupled to a tire;
a shaft connected to the rim through a center of the rim;
a motor assembly comprising a stator connected to the shaft in the rim and a rotor surrounding the stator to rotate about the stator;
a gear assembly comprising a sun gear disposed on a same centerline as the rotor, a plurality of planetary gears surrounding the sun gears, and a carrier connecting the plurality of planetary gears;
a cover coupled to an opening of the rim to block the motor assembly disposed inside the rim from an environment outside of the rim and having a center through which the shaft passes; and
a bearing positionally constrained inside the cover and supporting the shaft,
wherein the shaft comprises:
a first shaft body passing through the center of each of the rim and the cover and extending outward from the rim; and
a second shaft body having a larger diameter than a diameter of the first shaft body, and
wherein a power line for supplying power to the motor assembly is inserted into the second shaft body between the stator and the bearing in a radial direction and is extended in a longitudinal direction of the second shaft body,
wherein the second shaft body has a first end portion defining a stator press-fit surface to which the stator is press-fitted and a second end defining a bearing contact surface to which the bearing contacts,
wherein the second shaft body comprises:
a first hole defined between the stator press-fit surface and the bearing contact surface and defined in the radial direction of the second shaft body in which the power line from the stator is inserted; and
a second hole intersecting with the first hole and defined in the longitudinal direction of the second shaft body to take out the power line inserted through the first hole.

14. The in-wheel motor of claim 13, wherein the second shaft body comprises a power line-taken-out path through which the power line passes through in an L-shape and is taken out of the second shaft body.

15. The in-wheel motor of claim 14, wherein the power line-taken-out path comprises:
a first power line-taken-out path through which the power line is inserted in the radial direction into the second shaft body through a first hole of the second shaft body; and
a second power line-taken-out path intersecting with the first power line-taken-out line and through which the power line is inserted in the longitudinal direction of the second shaft body from an end of the first power line-taken-out path and is taken out through a second hole of the shaft body.

* * * * *